W. L. STANSBERRY.
COW HOPPLE AND TAIL HOLDER.
APPLICATION FILED JAN. 28, 1919.

1,315,689.

Patented Sept. 9, 1919.

WITNESS

INVENTOR
William L. Stansberry

UNITED STATES PATENT OFFICE.

WILLIAM L. STANSBERRY, OF MARSHALLTOWN, IOWA.

COW-HOPPLE AND TAIL-HOLDER.

1,315,689.  Specification of Letters Patent.  Patented Sept. 9, 1919.

Application filed January 28, 1919. Serial No. 273,662.

*To all whom it may concern:*

Be it known that I, WILLIAM L. STANSBERRY, a citizen of the United States, and resident of Marshalltown, in the county of Marshall and State of Iowa, have invented a certain new and useful Cow-Hopple and Tail-Holder, of which the following is a specification.

The object of my invention is to provide a hopple and tail holder particularly designed for use with milk cows, the device being of simple, durable and inexpensive construction.

More particularly it is my object to provide a device which can be quickly and easily secured to the hind legs of the cow for preventing kicking, said device having means for holding the cow's tail against switching during the milking operation.

With these and other objects in view, my invention consists in the construction, arrangement and combination of the various parts of the device, whereby the objects contemplated are attained, as hereinafter more fully set forth, pointed out in my claims, and illustrated in the accompanying drawings, in which:

Figure 3:
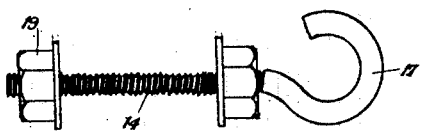
Fig. 3 shows a plan view of one of the hook bolts.
Figure 2:
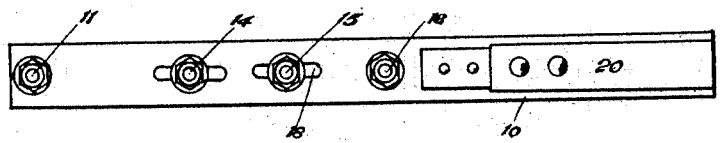
Fig. 2 shows a rear elevation of the same.
Figure 1:
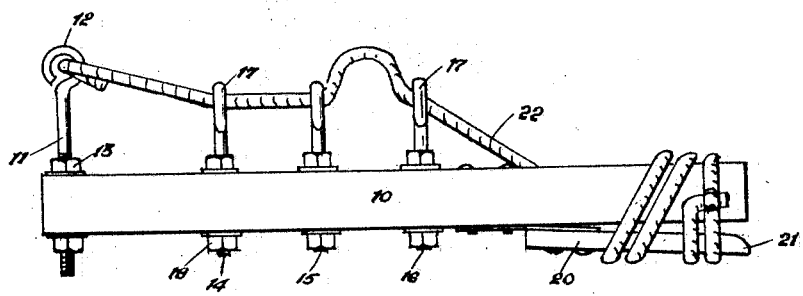
Figure 1 shows a top or plan view of a hopple and tail holder embodying my invention.

In the accompanying drawings I have used the reference numeral 10 to indicate generally a bar which may be of wood or any suitable material. Mounted in one end of the bar 10 is an eye-bolt 11, extending forwardly from the bar and having in its forward end the eye 12. On the bolt 11 are nuts 13, on opposite sides of the bar 10.

Spaced from the bolt 11 and spaced from each other, I preferably mount in the bar 10 three bolts 14, 15 and 16, which extend forwardly from the bar and have at their forward end hooks 17. The bolts 14 and 15 are preferably mounted in horizontally elongated slots 18 so that they may be adjusted longitudinally of the bar when adjustment is desired. All the bolts 14, 15 and 16 are provided with nuts 19 on opposite sides of the bar 10.

Secured to the rear surface of the bar 10, near the opposite end thereof from the eye-bolt 11, is a resilient clamping member 20, the free end of which normally stands somewhat spaced rearwardly from the bar 10 and is slightly beveled as at 21. Secured to the screw eye 12 is a rope or the like 22.

In the practical use of my improved hopple and tail holder the bar 10 is placed against the back of the hind legs of the cow just above the hock. The rope 22 is then extended in front of one leg and through two of the hooks 17, thence in front of the other hind leg and thence through the other hook 17.

The tail is slipped between the clamping member 20 and the bar 10. The beveled edge 21 facilitates this operation.

The rope 22 is then wound around the bar and fastened. It may be tied or it may be clamped between the member 20 and the bar.

It may be noted that the bolt 11 projects forwardly farther than the bolts 14, 15 and 16. This is a matter of some importance insomuch as it permits the user of the device to reach around the legs of the animal and reach the rope 22 which is fastened to the eye 12, with more ease and convenience than where the bolt 11 does not project forward so far.

For handling larger animals the bolts 14 and 15 are adjusted to be closer together for thus leaving more room between the bolts 14 and 11 and between the bolts 15 and 16, for the animal's legs.

When the device is in use the cow can be milked, and cannot switch her tail during that operation; nor can she kick until the hopple is removed.

Some changes may be made in the construction and arrangement of the parts of my improved device without departing from the essential features and purposes of my invention, and it is my intention to cover by this application any modified forms of structure or use of mechanical equivalents which may be included within the scope of my claims.

I claim as my invention:

1. In a device of the class described, a bar; a series of three bolts spaced from each other, extending through said bar and projecting forwardly therefrom, said bolts having hooks at their forward ends, said bar having longitudinally elongated slots in which two of said bolts are received; a fourth bolt extended through said bar near one end thereof, and projecting forwardly from said bar beyond said first described bolts; nuts on all of said bolts on opposite sides of said bar; a clamping device on the rear of said bar, adjacent to the end thereof opposite said last described bolt; and a rope secured to the forward end of the last described bolt and designed to be extended around the legs of an animal and through said hooks and secured to said bar for holding an animal's tail between said clamping device and the bar.

2. In a device of the class described, a bar; a plurality of bolts mounted in said bar and extending forwardly therefrom and having hooks on their forward ends, said bolts being capable of adjustment longitudinally of the bar; another bolt extended through said bar near one end thereof and projecting forwardly from the bar; and a clamping device on the bar on the opposite end thereof from the last bolt; and a rope secured to said last described bolt.

Des Moines, Iowa, December 27, 1918.

WILLIAM L. STANSBERRY.

Copies of this patent may be obtained for five cents each, by addressing the "Commissioner of Patents, Washington, D. C."